Aug. 8, 1944.   G. LAWTON   2,355,539
APPARATUS FOR CONCHING CHOCOLATE
Filed March 17, 1943

Inventor:
George Lawton,
By his attorneys
Baldwin & Wight

Patented Aug. 8, 1944

2,355,539

UNITED STATES PATENT OFFICE 2,355,539

APPARATUS FOR CONCHING CHOCOLATE

George Lawton, Highgate, London, England

Application March 17, 1943, Serial No. 479,524
In Great Britain August 26, 1941

2 Claims. (Cl. 259—102)

This invention relates to improved apparatus for the conching of chocolate, i. e., the working up of chocolate with exposure to air.

Various machines have been proposed and used for conching chocolate, but these are generally of a complicated and expensive character, or they require heavy power consumption to produce the desired output.

The improved machine according to the present invention comprises a structure carried by a rotatable shaft and having a plurality of rods or like members parallel or substantially parallel to the shaft, these rods or like members carrying in spaced relationship along their length discs, plates, or flanges, presenting an extensive surface area facing in the direction of the length of the rod or like member.

Preferably the discs or the like on one rod or like member are in staggered disposition with relation to the discs or the like on adjacent rods or like members and so that the discs or the like along one rod intercalate with the discs or the like on another rod.

The rotating structure, with its shaft horizontal, is mounted in relation to a trough containing the liquid chocolate so that the rods with the discs mounted thereon successively dip into the bath of liquid chocolate, and after passing through the same emerge carrying films of liquid chocolate on the faces of the discs from which the liquid chocolate will then drip back into the bath in a large number of droplets prior to re-immersion of the same rod with its discs. The fact that the discs or the like are mounted with their edges in the direction of travel will minimise the resistance to the passage of the successive parts of the structure through the liquid bath and will therefore minimise the power consumption. Moreover this is attained whilst a large area of liquid chocolate is exposed to air at each rotation of the structure.

The trough is jacketed so that it may be heated and cooled by, for example, steam and water.

The discs may be freely or fixedly mounted on the rods or like members, for example they may simply be threaded on to the rods with the interposition of short distance pieces. Any suitable number of rods may be disposed in angular spaced relationship with reference to the central rotating shaft, the diameters of the discs being related to the distances between the rods so that, as previously mentioned, the discs will overlap or intercalate. The discs may be mounted concentrically or eccentrically with respect to the rods.

The apparatus may work in the open, or it may be enclosed in a casing through which fresh air is circulated and from which used air is expelled, and/or in which a partial vacuum may be maintained.

The invention is illustrated by way of example in the accompanying drawing, in which.

Figure 1:
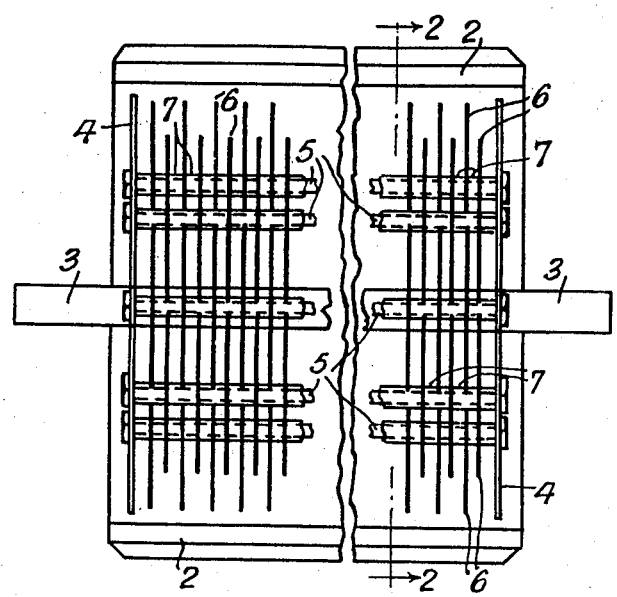
Figure 1 is a part plan view.
Figure 2:
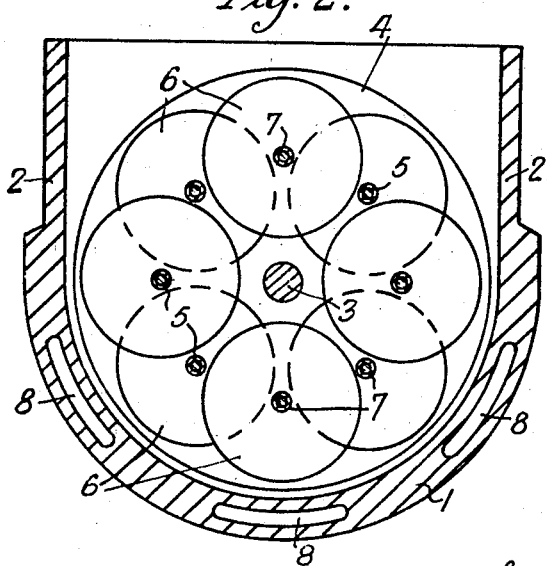
Figure 2 is a vertical section on the line 2—2 of Figure 1.

Referring to the drawing, 1 represents the casing of a curved trough for containing the liquid chocolate, and 2, 2 are the side walls of the trough.

Mounted in suitable bearings in the end walls is a shaft 3 to which are secured end plates 4. Rods 5 are secured to and extend between the end plates 4. On the rods 5 are freely mounted discs 6, spaced apart by distance pieces 7. The discs on the respective rods are arranged so that they intercalate as shown.

Passages 8 in the trough casing provide for the circulation of hot or cold fluid for regulating the temperature of the liquid chocolate.

In operation, the trough contains liquid chocolate to a level just below the shaft 3 which, as it rotates with the structure it carries, causes the rows of discs on the respective rods to dip successively into the bath of liquid chocolate, thereby collecting films of the liquid which are carried up into the air space and drip back into the bath.

I claim:

1. Apparatus for conching chocolate comprising a trough for containing a bath of liquid chocolate, a rotatable shaft journaled transversely in the trough, a structure carried by said shaft having rods substantially parallel to and in spaced relationship around said shaft, disks mounted on and in spaced relationship along said rods having their side faces fully exposed, the disks of one rod being in staggered disposition relative to the disks on an adjacent rod so that the disks along one rod intercalate with the disks on another rod, and the arrangement being such that as the shaft rotates the rods with the disks mounted thereon successively dip into and out of the bath of liquid chocolate.

2. Apparatus for conching chocolate comprising a trough to contain a bath of liquid chocolate, a shaft rotatably mounted on the trough, spaced apart plates on the shaft in the trough, rods mounted by said plates disposed about the shaft substantially parallel thereto, a plurality of discs mounted on and in spaced relationship along each of said rods, spacing elements on the rods between the discs, the discs of one rod being in staggered disposition relative to the discs of an adjacent rod so that the discs on one rod intercalate with the discs on another rod, said rods constituting the sole support for the discs whereby their side faces are fully exposed and as the shaft rotates, the discs will successively dip into and out of the bath of liquid chocolate.

GEORGE LAWTON.